United States Patent [19]

Larsson et al.

[11] 4,292,725

[45] Oct. 6, 1981

[54] METHOD OF PRODUCING AN OBJECT OF FIBER REINFORCED METAL MATERIAL

[75] Inventors: Leif Larsson, Trollhättan; Richard Warren, Landvetter, both of Sweden

[73] Assignee: Volvo Flygmotor AB, Trollhattan, Sweden

[21] Appl. No.: 29,516

[22] Filed: Apr. 12, 1979

[30] Foreign Application Priority Data

Apr. 17, 1978 [SE] Sweden .............................. 7804337

[51] Int. Cl.³ ........................................... B23P 17/04
[52] U.S. Cl. .................................. 29/419 R; 228/217
[58] Field of Search .................... 29/419; 75/208, 226; 228/217

[56] References Cited

U.S. PATENT DOCUMENTS

| | | | |
|---|---|---|---|
| 3,627,521 | 12/1971 | Vordahl | 75/226 |
| 3,653,882 | 4/1972 | Petrasek et al. | 75/208 |
| 3,828,417 | 8/1974 | Divecha | 29/419 R |
| 3,864,807 | 2/1975 | Schneider et al. | 29/419 R |
| 3,882,587 | 5/1975 | Schneider et al. | 29/419 R |

Primary Examiner—Gil Weidenfeld
Assistant Examiner—K. J. Ramsey

Attorney, Agent, or Firm—Pollock, Vande Sande & Priddy

[57] ABSTRACT

A method of producing an object of fiber reinforced metal material, in which method a plurality of fibers or fiber bundles of a material of high strength are arranged at spaced positions, and a matrix material, preferably metal or metal alloy, is brought to closely surround each fiber or fiber bundle and is formed to a shape corresponding to the desired shape of the object. Earlier attempts to produce objects of fiber reinforced metal material have encountered problem regarding the arrangement of the fibers in a uniform pattern and in obtaining a predetermined volume fraction of the fibers in the completed object. According to the invention each fiber bundle is inserted in a tube, made of the matrix material and having suitable wall thickness to give the desired spacing between the fibers or fiber bundles, the tubes are placed in a casing, which is intended to give the object the desired outer configuration and preferably is made of the matrix material, and the casing with the tubes and fibers or fiber bundles arranged therein is subjected to hot isostatic pressing at high pressure and high temperature during an interval of time that is sufficient to give plastic deformation of the material to a substantially dense material.

9 Claims, 4 Drawing Figures

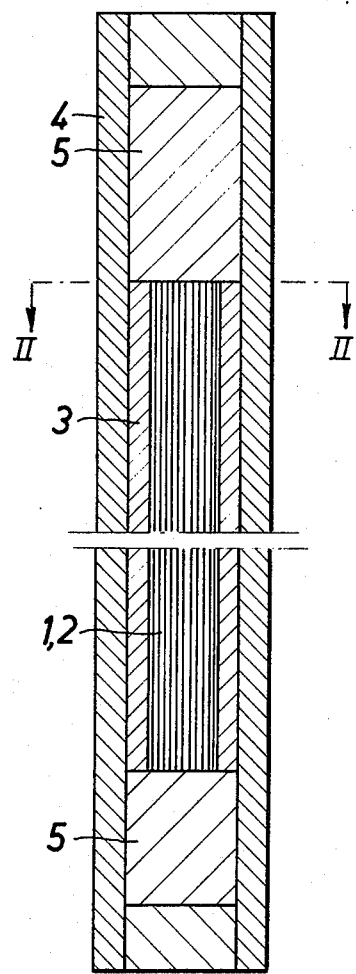
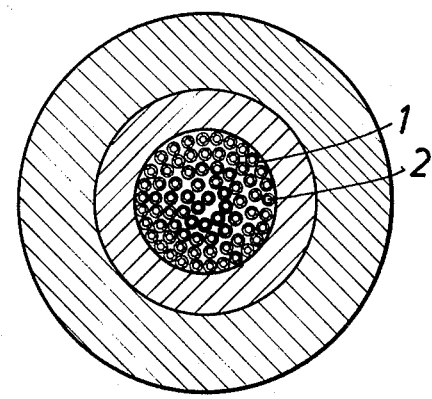

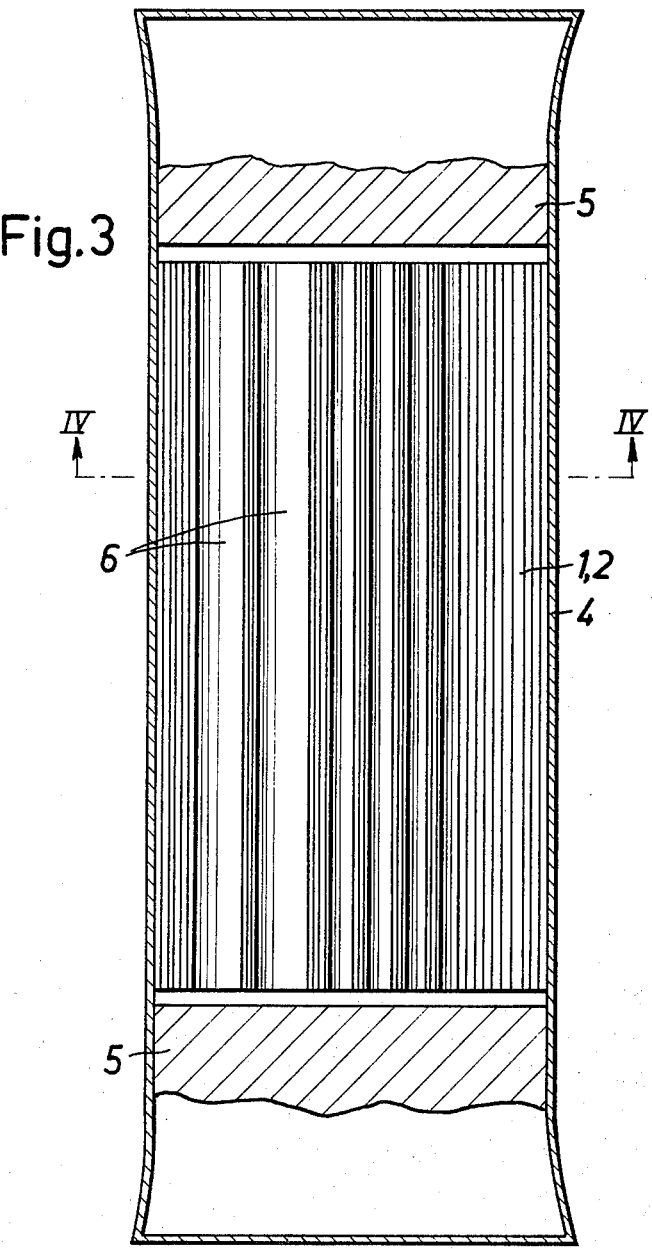

METHOD OF PRODUCING AN OBJECT OF FIBER REINFORCED METAL MATERIAL

BACKGROUND ART

The present invention relates to a method of producing an object of fiber reinforced metal material, in which method a plurality of fibers or fiber bundles of a material of high strength are arranged at spaced positions, and a matrix material, preferably metal or metal alloy, is brought to closely surround each fiber or fiber bundle and is formed to a shape corresponding to the desired shape of the object.

Fiber reinforced metal materials, so called composites, is a type of material that is being used to an increasing extent. If a material of this type is used for example in turbine vanes of the type employed in gas turbines, it would be possible to increase the performance of the gas turbine quite substantially by using an oxidation resistant metal material reinforced with fibers or wires of a material having high strength properties at high temperatures. Earlier attempts to produce objects of fiber reinforced metal materials have, however, not been completely satisfactory. Problems have been encountered regarding the arrangement of the fibers in a uniform pattern with the fibers straight and parallel and having a predetermined volume fraction of the fibers in the completed object. Further problems have been encountered regarding the possibility of having the matrix material completely surround each fiber and regarding the consolidation of the material in to a dense material. In previously known methods, the fibers or the wires have usually been arranged in the desired pattern in a frame or the like, whereupon the matrix material has been added either in the form of a liquid or in the form of a powder. The former method gives a dense material, but when using high temperature alloys (e.g. nickel-base alloys) unacceptable reactions between the fibers and the matrix material occur, e.g. recrystallization of the fiber material, dissolution of the fiber material, and chemical reactions between the fiber material and the matrix material. When using matrix material in the form of a powder, carefully controlled methods are required during the consolidation procedure in order to obtain a dense material and to avoid oxidation of the powder. When using this method it is furthermore difficult to obtain high volume fractions of fiber material in the finished object.

OBJECTS AND SUMMARY OF THE PRESENT INVENTION

An object of the present invention is to provide a method which eliminates the above-mentioned disadvantages and makes it possible to easily produce objects having the desired shape and having the desired volume fraction of fiber material, with the objects being completely homogeneous, so that the fiber material is completely surrounded by matrix material, and is not subject to destruction by mechanical stress or recrystallization when the method is carried out.

In a method according to the present invention, each fiber or fiber bundle is inserted in a tube made of the matrix material and having suitable wall thickness to give the desired spacing between the fibers or fiber bundles in the tubes are placed in a casing intended to give the object the desired outer configuration and preferably made of the matrix material, following which the casing with the tubes and fibers or fiber bundles arranged therein is subjected to hot isostatic pressing at high pressure and high temperature during an interval of time that is sufficient to give plastic deformation of the material in to a substantially dense material.

BRIEF DESCRIPTION OF THE DRAWINGS

The present invention is described in detail below with reference to the accompanying drawings, in which:

FIG. 1 shows a longitudinal section through a cylindrical object formed according to the invention before consolidation;

FIG. 2 shows a transversal section through the object according to FIG. 1;

FIG. 3 shows a longitudinal section through another object produced by the method according to the invention; and, FIG. 4 shows a transverse section through the object according to FIG. 3.

DETAILED DESCRIPTION OF THE PREFERRED EMBODIMENT

The structure of an object according to the present invention is best seen in FIGS. 1 and 2, and as shown in these figures the object includes a plurality of tubes 1 of small diameter, wherein the tubes 1 are made of a desired matrix material, e.g., stainless steel. In each tube 1 a fiber or wire 2 is inserted, and this fiber is made of the desired reinforcement material, which e.g. which may be tungsten or a tungsten based metal alloy. The internal diameter of the tubes 1 is preferably somewhat larger than the diameter of the fibers 2 in order to facilitate the insertion of the fibers into the tube. In order to obtain the desired volume fraction of fibers in the finished object the wall thickness of the tubes may be varied in the desired extent. The tubes 1 are surrounded by a larger tube 3, which for the shown object is cylindrical. However, the tube 3 may have other shapes. The tube 3 is thereafter inserted in a casing in the form a tube 4, which may be made of a material more oxidation resistent than the matrix material forming tubes 1. At least one end of the outer tube 4 is provided with a plug 5 of titanium, whereupon the outer tube 4 is closed by welding in both ends. When the assembly is then heated the titanium plugs 5 react with the nitrogen and oxygen in the enclosed air in order to evacuate the air from the free space in the casing. Then the object is ready for treatment by hot isostatic pressing, whereby the object is deformed plastically, so that the material becomes homogeneous and dense.

In FIGS. 3 and 4 there is shown an object or article of commerce having a cross-sectional shape generally similar to the profile of a conventional turbine vane. This object is built up in principally the same way as the object according to FIGS. 1 and 2, i.e. with a plurality of fibers or fiber bundles 2 positioned in tubes 1, which are arranged in outer casing 4. However, in the object according to FIGS. 3 and 4 rods 6 of the matrix material are placed between the tubes 1 in predetermined positions. In this way the fiber density of the finished object may be varied, so that the fiber density in e.g. a turbine vane is greater at the trailing edge, where the stresses are great and cooling is difficult to obtain.

EXAMPLE

In an example of the method according to the present invention, an 18/8 stainless steel, type 304 material was used as matrix material. The tubes 1 of the matrix material had an internal diameter of 0.4 mm and a wall thickness of 0.15 mm. As fiber material, tungsten fibers with 2 weight percent thoriumdioxide were used, said fibers having a diameter of 0.3 mm, a tensile strength of 2600 MN/m$^2$ and a rupture strain of 5%. After thorough ultrasonic cleaning in carbon tetrachloride, the fibers were inserted in the tubes, which were then cut to the desired length. The tubes were collected and inserted into the casing, with as many tubes as possible being inserted into the casing. The casing had an outer diameter of 6 mm and an internal diameter of 4 mm. Thereafter, the blank was inserted in outer casing having an internal diameter of 6.2 mm and an outer diameter of 10.2 mm, said outer casing being used in order to give the desired cross-sectional area. The outer casing was closed at one end. The blank was inserted in the outer casing with a small plug of titanium in each end (see FIG. 1). The outer casing was then closed by welding the open end. Thereafter one end was heated so that the titanium plugs evacuated oxygen and nitrogen from the free spaces in the casing. Thereupon, the object was subjected to hot isostatic pressing for 1 hour at 1000° C. and 170 MPa and for 3 hours at 1180° C. and 190 MPa. After the hot isostatic pressing the object had a diameter corresponding to full density of the material, and a section through the object confirmed that the material was completely dense. The core of composite material was both circular and central, and the fibers were uniformly distributed. A longitudinal section through the object showed that the fibers were intact and substantially parallel. An intermetallic layer having a thickness of 12 μm had formed between the fiber material and the matrix material. This layer had an even thickness and contained no cracks. The reduction of the diameter of the fibers corresponded approximately to the amount of tungsten required to form the intermetallic layer, and therefore very little reinforcement had been lost due to the intermetallic layer.

The upper limit for the temperature during the hot isostatic pressing should be chosen, so that there is a reasonable margin (approximately 100° C.) to the eutectic phase with lowest melting point that can form in the combination of fiber material and matrix material used. At the same time recrystallization of the fibers must be avoided, and further diffusion processes in the boundary area between fibers and matrix material may be affected by time and temperature and present special requirements. The lower limit for the temperature during the hot isostatic pressing must be chosen sufficiently high, so that a reasonable pressure and a reasonable time gives the necessary plastic deformation in the matrix material, so that a dense material is obtained. By the combination of the materials stated in the above-described example may be used a temperature of 1000°–1250° C., a pressure of 150–200 MPa and a time of about 3 hours. However, this time may be substantially reduced if optimum conditions regarding pressure and temperature are chosen.

We claim:

1. A method of manufacturing a fiber reinforced metal object having a substantially uniform density metallic matrix material throughout, comprising the following steps:
    positioning each of a plurality of separate, previously drawn fibers of a tungsten-based metallic material in a separate tube of metallic matrix material;
    positioning each of said fiber-filled tubes of metallic matrix material within a single casing having a configuration substantially similar to the configuration of said metal object;
    isostatically pressing said casing and said fiber-filled tubes positioned therein at a temperature above ambient room temperature and below the lowest temperature necessary for melting both said fibers and said matrix material, thereby causing plastic deformation of said fiber-filled tubes into an object having the desired configuration of said metal object with substantially uniform density metallic matrix material throughout.

2. A method according to claim 1, including the additional step of selectively positioning rods of matrix material between predetermined pairs of adjacently disposed fiber-filled tubes positioned within said single casing for providing unreinforced areas within said metal object of manufacture.

3. A method according to claim 1, including the additional step of heating and maintaining said casing of matrix material and said enclosed fiber-filled tubes at a temperature substantially 100° C. below that temperature sufficient for causing eutectic melting of said fiber-filled tubes while isostatically pressing said casing.

4. A method according to claim 1, including the additional step of isostatically pressing said casing until said casing has a diameter corresponding to the desired diameter of said metal object.

5. A method according to claim 1, including the additional step of positioning each of said fiber-filled tubes of metallic matrix material within a single casing also formed of said matrix material.

6. A method according to claim 1, including the additional step of positioning a plug of titanium material within said fiber-filled casing.

7. A method according to claim 6, including the additional step of sealing opposite end portions of said casing after insertion of said titanium plug.

8. A method according to claim 7, including the additional step of heating the sealed casing and titanium plug positioned therein for drawing free air present in the casing to said titanium plug prior to isostatically pressing said casing.

9. A method according to claim 1, including the additional step of isostatically pressing said casing and said fiber-filled tubes positioned therein at a first temperature for a predetermined period of time, heating said casing to a second, hotter temperature and isostatically pressing said casing for a further predetermined period of time.

* * * * *